Aug. 31, 1965    A. L. NIXON ETAL    3,203,627
BUSINESS CONTROL APPARATUS
Filed May 15, 1963    4 Sheets-Sheet 1

INVENTORS.
Albert L. Nixon
Arnold E. Hardy
BY
Newton, Hopkins & Jones
ATTORNEYS

Aug. 31, 1965

A. L. NIXON ETAL 3,203,627

BUSINESS CONTROL APPARATUS

Filed May 15, 1963

INVENTORS.
Albert L. Nixon
Arnold E. Hardy
BY Newton, Hopkins & Jones
ATTORNEYS

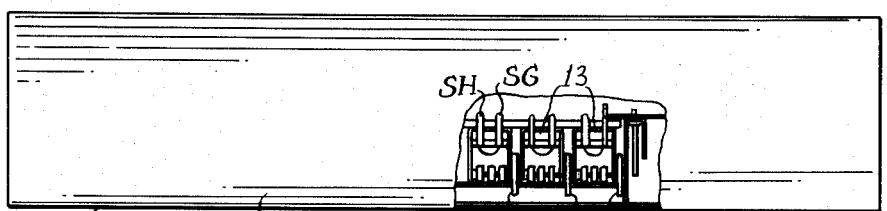
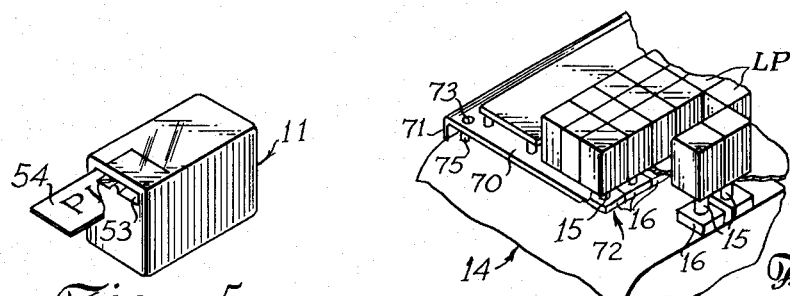
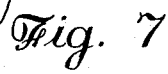
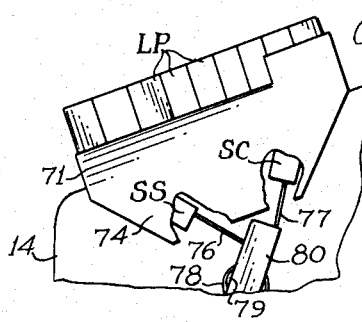
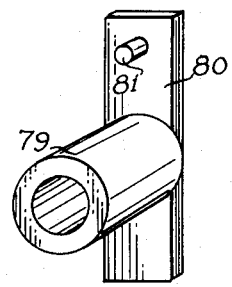
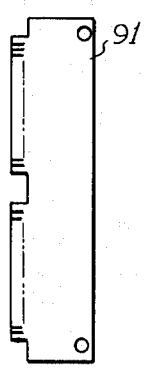
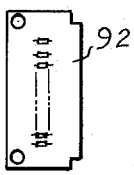
INVENTORS.
Albert L. Nixon
Arnold E. Hardy
BY Newton, Hopkins & Jones
ATTORNEYS INVENTORS.
Albert L. Nixon
Arnold E. Hardy
BY Newton, Hopkins & Jones
ATTORNEYS United States Patent Office 3,203,627
Patented Aug. 31, 1965

3,203,627
BUSINESS CONTROL APPARATUS
Albert L. Nixon, Chamblee, and Arnold E. Hardy, Decatur, Ga., assignors to Multi/Chek, Inc., Atlanta, Ga., a corporation of Georgia
Filed May 15, 1963, Ser. No. 269,393
5 Claims. (Cl. 235—146)

This invention relates to business control apparatus, and more particularly to business control apparatus for automatically entering, recording, and tabulating the business effects of a business transaction.

In many business and commercial enterprises, it is desirable that there be a continuous record of the quantity of each item or article sold and it is essential that each item sold be correctly priced when determining the amount of a sale or for other purposes. The continuous record of the quantity of items sold provides a continuous inventory which permits the prompt reordering of items and efficient planning. The correct pricing of each item prevents losses to the business or commercial enterprise and customer dissatisfaction.

The invention disclosed herein provides an apparatus which will accomplish these and other useful functions. It is an apparatus into which the sale of an item is entered simply by pressing an appropriately marked key. The pressing of the key will cause the sale of the item to be recorded by a counter which continuously summarizes the quantity of these items sold. The pressing of the key also causes the correct price of the item to be entered into conventional business machine such as a calculating or adding machine where it is utilized by the business machine in accordance with its capabilities. The particular price entered into the calculating or adding machine equipment for an item is not dependent upon the operator. Rather, it is set into the apparatus so that there is no possibility of operator error or dishonesty.

Thus, when used in combination with various types of business machines and similar equipment, the apparatus permits full benefit of such eqipment to be obtained since the apparatus insures that the entries into the equipment are always correct. Moreover, in addition to insuring that each entry into the business machine is correct, the apparatus simultaneously maintains a continuous record of the quantity of each item sold. All of these and other business control functions are obtained by simply pressing the single key associated with each item.

These improvements in business control are provided by an apparatus comprising a keyboard unit into which a sale is entered by pressing a key, a recording unit which individually records each sale on a particular counter, and a transducer unit which enters the proper sales price into the business machine. The business machine operated by the apparatus and the recording unit may be positioned adjacent to or remote from the keyboard unit depending upon the apparatus arrangement desired. Means is provided for changing the price entered into the business machine when a particular key is depressed. However, once the price is fixed, it cannot be changed by accident or error and will always be correctly entered into the business machine.

These and other features and advantages of the invention will be more clearly understood from the following detailed description and the accompanying drawings in which like characters of reference designate corresponding parts in all figures and in which:

FIG. 5 is a perspective view of one of the plurality of keys.

FIG. 6 is a top plan view of the recording unit with a portion of its top plate cut away to show some of the plurality of counters mounted therein.

FIG. 7 is a perspective view of the transducer unit with its cover removed.

FIG. 8 is a side elevational view of the transducer unit with its cover removed.

FIG. 9 is a perspective view of the crank adapter.

FIG. 10 is a plan view of a pricing network board.

FIG. 11 is a plan view of a tax network board.

FIG. 12 is a perspective view of the connector block into which a pricing network board and a tax network board are inserted.

Figure 1:
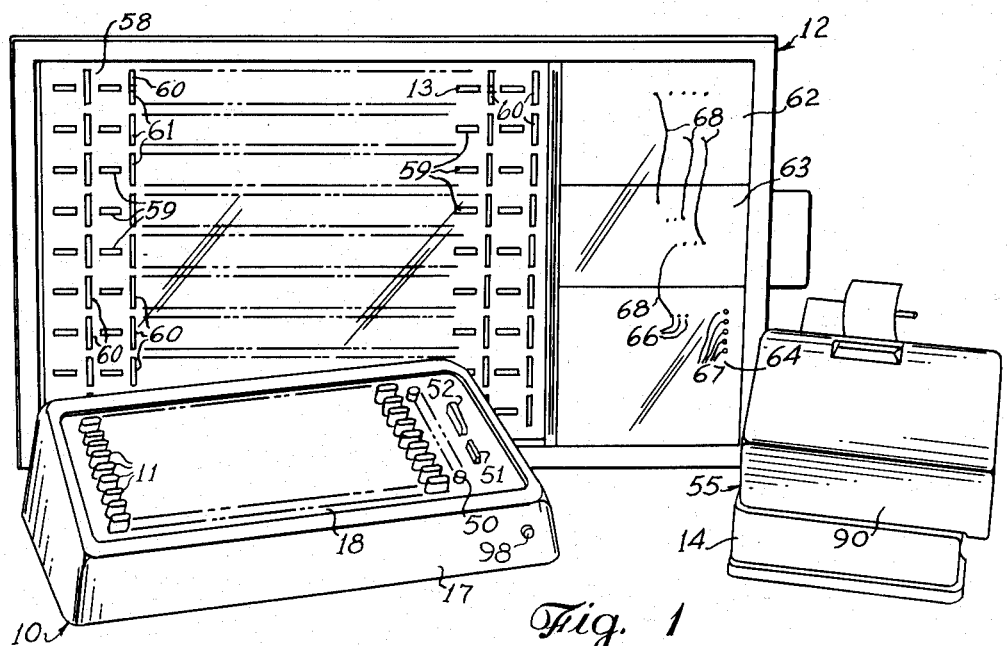
FIG. 1 is a perspective view of the business control apparatus showing the keyboard unit, the recording unit, and the transducer unit mounted on a conventional business machine.
Figure 2:
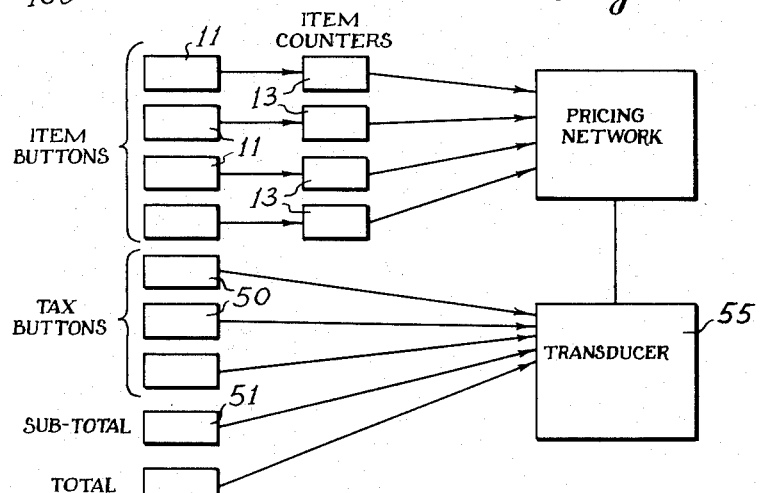
FIG. 2 is a schematic presentation of the business control apparatus.

These figures and the following detailed description disclose a preferred specific embodiment of the invention, but the invention is not limited to the details disclosed since it may be embodied in other equivalent forms.

This invention is best understood as comprising a keyboard unit 10 having a plurality of keys 11, a recording unit 12 having a plurality of counters 13, each counter 13 being responsive to the depressing of one of the plurality of keys 11, and a transducer unit 55 mounted on a conventional business machine 14 and having a plurality of button depressors 15 arranged to depress one of the buttons 16 of the business machine 14 when one of the plurality of keys 11 is depressed. The keyboard unit 10 is a cabinet 17 having top panel 18 and a bottom panel 19 and having within the cabinet 17 and between the top panel 18 and the bottom panel 19, a lower support plate 20, and interlock plate 21, and an upper support plate 22. The lower support plate 20 is fixedly positioned within the cabinet 17 by extending brackets 23 between it and the bottom panel 19 and the upper support plate 22 is fixedly positioned within the cabinet 17 by fixedly placing spacer cylinders 24 between the upper support plate 22 and the lower support plate 20. These spacer cylinders 24 maintain the upper support plate 22 and the lower support plate 20 a fixed distance apart and parallel to each other.

The interlock plate 21 is positioned between the upper support plate 22 and the lower support plate 20 by extending bearing posts 25 downward from the upper support plate 22 and upward from the lower support plate 20 so as to engage opposite sides of the interlock plate 21. This arrangement makes the interlock plate 21 slidably movable in a plane between and parallel to the upper support plate 22 and lower support plate 20 and between the spacer cylinders 24. The upper support plate 22, the interlock plate 21, and the lower support plate 20 each have a plurality of slots 26 through which a plurality of plungers 27 extend. Each plunger 27 extends perpendicular to the interlock plate 21 through a slot 26 in the upper support plate 22, a slot 26 in the interlock plate 21, and a slot 26 in the lower support plate 20. Each of the plurality of plungers 27 has its upper end above the upper support plate 22 and its lower end below the lower support plate 20.

The plungers 27 are slidably movable through the slots 26 and each plunger 27 has either a key 11, a tax button 50, a subtotal bar 51, or a total bar 52 fixedly attached to its upper end. The keys 11, tax buttons 50, subtotal bar 51, and total bar 52 extend through holes 28 in the top panel 18. The keys 11 are of transparent material such as plastic and each has a slit 53 in one side for the insertion and removal of a paper slip 54 carrying the name of an item to be sold. The name of an item on a paper slip 54 inserted into a key 11 can be readily changed. However, when the paper slip 54 is inserted into the key 11, the name of the item is visible and will not become dirty or difficult to read with use of the apparatus.

In the specific embodiment of the invention shown, the keys 11 are for entering into the apparatus each sale of a variety of items. The tax buttons 50 are for entering the tax on the sale of an item or many items, the subtotal bar 51 is for causing the business machine 54 to subtotal the prices of a plurality of items, and the total bar 52 is for causing the business machine 14 to total the prices of and tax on a plurality of items. As a result, only the keys 11 carry the name of items. The tax buttons 50 carry indicia showing selected amounts of tax and the subtotal bar 51 is appropriately marked to show its use in causing the business machine 14 to subtotal the entries.

The total bar 52 is appropriately marked to show its use in causing the business machine 14 to total entries into the business machine 14. Moreover, the total bar 52 is larger than the keys 11, the tax buttons 50, or the subtotal bar 51 because the purpose of the total bar 52 requires it to be most frequently depressed. The large size of the total bar 52 tends to tilt the plunger 27 to which the total bar 52 is attached when the total bar 52 is not depressed directly over the plunger 27. To prevent tilting of this plunger 27 and the jamming of the plunger 27 in the slots 26 when the total bar 52 is depressed, a guide shaft 84 is attached to the total bar 52 and slidably extended into a guide cylinder 85 fixedly attached to and extending through the upper support plate 22 and the lower support plate 20. The guide shaft 84 is slidably movable within the guide cylinder 85 when the plunger 27 attached to the total bar is depressed by depressing the total bar 52.

Each plunger 27 has a ring 29 fixedly attached to its lower end. Each ring 29 is attached to the lower end of a plunger 27 by extending a pin 30 through a passage in the ring 29 and a hole in the lower end of the plunger 27. Each ring 29 checks the upward motion of the plunger 27 to which the ring 29 is attached by engaging the underside of the lower support plate 20 when the plunger 27 is raised. A spring 31 encircles the upper end of the guide shaft 84 and the upper end of each plunger 27. Each spring 31 extends between a key 11, a tax button 50, the bar 51 or the bar 52 and the upper support plate 22 and urges the key 11, the tax button 50, the bar 51, or the bar 52 and the plunger 27 to which each is attached upward until the ring 29 engages the lower support plate 20. The result is that each plunger 27 is depressible against spring 31 pressure but will be normally in a raised position with the ring 29 engaging the lower support plate 20.

A plurality of microswicthes MK and MT are fixedly positioned on the bottom panel 19 between the bottom panel 19 and the lower support plate 20. Each of the plurality of microswitches MK is positioned with its actuator 33 beneath one of plurality rings 29 on the lower end of a plunger 27 having a key 11 on its upper end. Each of the plurality of microswitches MT is positioned with its actuator 33 beneath one of the plurality of rings 29 on the lower end of a plunger 27 having a tax button 50 on its upper end. A microswitch (not shown) is positioned on the bottom panel 19 with its actuator 33 beneath the ring 29 on the lower end of the plunger 27 having the subtotal bar 51 attached to its upper end and a microswitch T is positioned on the bottom panel 19 with its actuator 33 beneath the ring 29 on the lower end of the plunger 27 having the total bar 52 attached to its upper end.

Depressing a key 11 causes a microswitch MK to close, depressing a tax button 50 causes the microswitch MT to close, depressing the subtotal bar 51 causes the microswitch ST to close, and depressing the total bar 52 causes the microswitch T to close. Each of the plurality of plungers 27 has a lower notch 34 and an upper notch 35 in that portion of its length between the upper support plate 22 and lower support plate 20. The lower notch 34 in each plunger 27 is positioned so that it will be in the plane of motion of the interlock plate 21 when the plunger 27 is fully raised by spring 31 action and the ring 29 is engaging the lower support plate 20. The upper notch 35 in each plunger 27 is positioned so that it will be in the plane of motion of the interlock plate 21 when the plunger 27 is depressed to the degree sufficient to place the ring 29 in contact with the actuator 33 of the microswitch MS, MT, ST or T located beneath the ring 29.

When the interlock plate 21 is slidably moved between the upper support plate 22 and the lower support plate 20 and forced against that side of each plunger 27 and if the plungers 27 are all fully raised, the interlock plate 21 will enter the lower notch 34 of every plunger 27 and will prevent the depressing of any plunger 27. If any of the plungers 27 are depressed when this locking motion of the interlock plate 21 occurs, the interlock plate 21 will enter the upper notch 35 of the depressed plungers 27 and the lower notch 34 of all other plungers 27. As a result, the interlock plate 21 holds the depressed plungers 27 down while preventing the depressing of other plungers 27. The upper notch 35 in each plunger 27 has sufficient length along the line of vertical motion of the plungers 27 to permit some vertical motion of the plungers 27 even if the interlock plate 21 is extending into the upper notch 35.

The length of the upper notch 35 is selected so that the plunger 27 is vertically movable between that position in which the ring 29 engages the actuator 33 of a microswitch MS, MT, ST or T and a slightly higher vertical position in which the ring 29 no longer engages the actuator 33. The interlock plate 21 in locking position will prevent all plungers 27 not depressed from being depressed and will in cooperation with the springs 31 position depressed plungers 27 with their rings 29 above the actuators 33 beneath them. Thus, only when a key 11 is being manually depressed will the actuator 33 of a microswitch MS, MT, ST or T be engaged so as to operate the microswitch MS, MT, ST or T.

Figure 3:
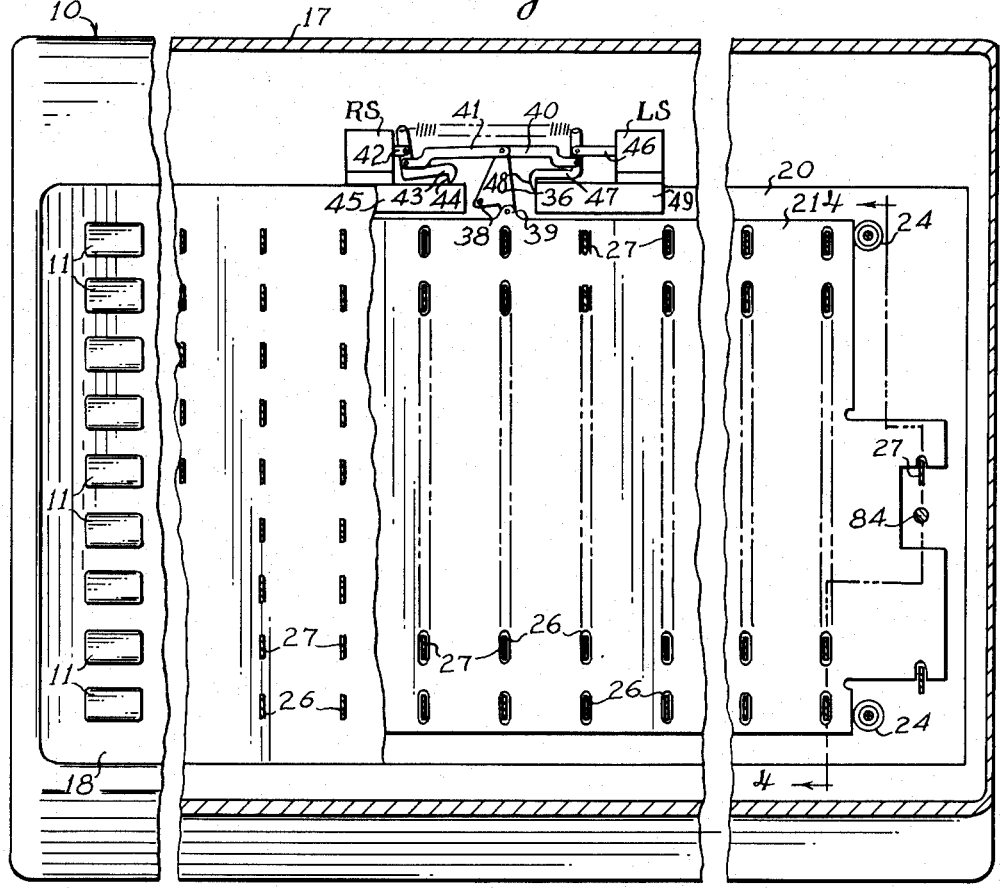
FIG. 3 is a top plan view of the keyboard unit of the business control apparatus with top panel cut away to show the upper support plate and with the top panel and upper support plate cut away to show the mechanical interlock mechanism.
Figure 4:
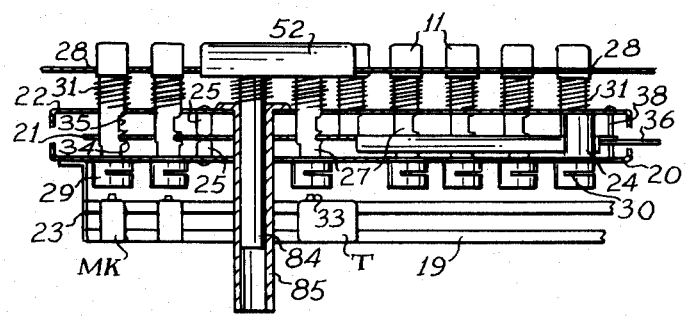
FIG. 4 is a sectional view of the keyboard unit taken in line 4—4 in FIG. 3.

The slidable position of the interlock plate 21 can be controlled by motor driven pivot arms, by ratchets or by any arrangement responsive to electric current. However, in the specific embodiment of the invention chosen for illustration, the slidable position of the interlock plate 21 is controlled by a mechanical interlock mechanism having a triangular plate 36 with one corner pivotally mounted on a shaft 38 extending upward from the lower support plate 20, one corner pivotally attached to a tab 39 extending from the upper edge of the interlock plate 21 and one corner pivotally attached to the ends of a locking lever 40 and a releasing lever 41. The locking lever 40 and the releasing lever 41 extend from the corner of the triangular plate 36 in opposite directions and when the locking lever 40 and the releasing lever 41 are moved to the right as viewed in FIG. 3, the triangular plate 36 rotates about shaft 38 in a clockwise direction. This causes the interlock plate 21 to move downward into locking position. When the locking lever 40 and releasing lever 41 are moved to the left as viewed in FIG. 3, the plate 36 rotates in a counter-clockwise direction and raises the interlock plate 21 to its releasing position. Locking and releasing motions of the locking lever 40 and releasing lever 41 are obtained from a releasing solenoid RS and a locking solenoid LS. The releasing solenoid RS is mounted to the left of the triangular plate 36 and the locking solenoid LS is mounted to the right of triangular plate 36.

A plunger 42 extends from the releasing solenoid RS toward the releasing lever 41 and the end of the plunger 42 and the end of the releasing lever 41 most remote from the triangular plate 36 are both pivotally attached to a hook member 43. This hook member 43 is right angular and has one leg substantially perpendicular to the releasing lever 41 and its other leg extending toward the triangular plate 36. At the end of the extending leg of the hook member 43 is a hook 44. The plunger 42 and the releasing lever 41 are attached at different points along the perpendicular leg of the hook member 43 and motion of the plunger 42 toward the releasing solenoid RS will initially rock the hook member 43 before imparting motion to the releasing lever 41. This rocking motion of the hook member 43 disengages the hook 44 from a locking surface 45 positioned adjacent to the triangular plate 36.

The locking lever 40 is associated with the locking solenoid LS in a manner similar to that in which the releasing lever 41 is associated with the releasing solenoid LS. A plunger 46 extends from the locking solenoid LS and its extending end is attached with the end of the locking lever 40 to a hook member 47. This hook member 47 has a hook 48 and rocks slightly with initial motion of the plunger 46 toward the locking solenoid LS so as to disengage the hook 48 from a locking surface 49.

The hook 44 engages the locking surface 45 only when the plunger 42 is extended and the hook 48 engages the locking surface 49 only when the plunger 46 is extended. Either hook 44 engaging locking surface 45 or hook 48 engaging locking surface 49 will prevent motion of the locking lever 40 and releasing lever 41 and the hooks 44 and 48 serve to fixedly position the interlock plate 21 until initial motion of either plunger 42 or 46 occurs.

When neither the releasing solenoid RS nor the locking solenoid LS is energized the interlock plate 21 is held in plunger 27 locking position or plunger 27 releasing position by the hook 44 or 48 engaging either the locking surface 45 or 49. When the interlock plate 21 is in plunger 27 locking position and solenoid RS is energized, the initial motion of plunger 42 rocks the hook member 43 and disengages the hook 44 from the locking surface 45 and the continued motion of the plunger 27 toward the releasing solenoid LS raises the interlock plate 21 to plunger 27 releasing position where the hook 48 engages the locking surface 49. Similarly, when the locking solenoid LS is subsequently energized, the hook 48 disengages the locking surface 49, the interlock plate 21 moves to plunger 27 locking position, and the hook 44 engages the locking surface 45 where it remains until the release solenoid RS is again energized. This arrangement permits the interlock plate 21 to be moved between plunger 27 locking position and plunger 27 releasing position while being fixedly positioned in each position.

The recording unit 12 is a box-like cabinet 56 having a counter portion and patching portion. In the counter portion are a plurality of counters 13 mounted in rows on racks (not shown). A front panel 58 covers the counter portion of the recording unit 12 and has a plurality of windows 59 through which the indicia of the counters 13 can be viewed and a plurality of slits 60 through which the clearing wheels 61 of the counters 13 extend. These counters 13 are of known type, each having an electromagnet LC which when energized causes the counter indicia to advance one unit and closes two normally open switches SH and SG. The indicia of the counters 13 are returned to zero by simply rotating the clearing wheels 61.

One side of the electromagnet LC of each counter 13 is wired through a normally closed switch SW-1 to any convenient source of 150 volts direct current. The other side of the electromagnet LC of each counter 13 is wired in parallel through the switch SH of the counter 13 to ground and through one of the plurality of microswitches MK to ground.

The patch portion of the recording unit 12 comprises a keyboard panel 62, a network panel 63, and a patching panel 64, the keyboard panel 62 has a plurality of jacks JK. Each of these jacks JK is wired directly to ground through the switch SG of one of the plurality of counters 13. The pricing panel 63 has a plurality of jacks JP, each of which is wired to any convenient source of 150 volts direct current through the solenoid LP of one of the plurality of button depressors 15 of the transducer unit 55 and a normally open switch SW-2. Each jack JP is also wired to the source of 150 volts direct current through a diode D and electromagnet L-1.

The patching panel 64 has a plurality of input jacks 66 and output jacks 67. Each input jack 66 is wired directly to two output jacks 67. Patch cords 68 are used to join a jack JK to a jack JP and if it is desired to join a plurality of jacks JP to a single jack JK, patch cords 68 are used to join the jack JK to an input jack 66 of the patching panel 64 and the output jacks 67 to a plurality of jacks JP. In this manner, the electromagnet LC of a counter 13 may be placed in series with the solenoid LP of any button depressor 15 by the particular arrangement of patching cords 68 used. This permits the closing of a particular microswitch MK to energize any one or more of the plurality of solenoids LP depending upon the patch cord arrangement.

The patching panel 64 is also used in a similar manner to join a single jack JP to a plurality of jacks JK. When this patch cord 68 arrangement is used the solenoid LP of a single button depressor 15 is in series with the electromagnet LC of each of a plurality of counter 13. This permits the closing of any one of a plurality of microswitches MK to energize the same solenoid LP in a manner to be described.

The button depressors 15 of the transducer unit 55 are arranged in rows on a mounting plate 70. The mounting plate 70 has flanges 71 at its sides and is positioned over the key panel 72 of a business machine 14 by inserting screws 73 through mounting posts 75 positioned between the mounting plate 70 and the key panel 72 of the business machine 14 and into the key panel 72 of the business machine 14. When the mounting plate 70 is positioned over the key panel 72 of a business machine 14, there is a button depressor 15 positioned over each of the buttons 16 of the business machine 14 which it is desired for the apparatus to operate.

The button depressors 15 are of known type having a plunger which extends only when its solenoid LP is energized. The mounting plate 70 has holes through which the plunger of each button depressor 15 can extend to engage the button 16 beneath the button depressor 15. The plungers extend with sufficient force to depress the buttons 16 when the solenoid LC of a plunger is energized.

In the specific embodiment of the invention described herein, the button depressors 15 are positioned to depress buttons 16 having whole dollar indicia, buttons 16 having cent indicia as units of ten, buttons 16 having cent indicia as units of one, a button 16 which causes the business machine 14 to cycle and accept an entry is a tax entry, a button 16 which causes the business machine 14 to cycle and accept an entry as a price entry, a button 16 which causes the business machine 14 to cycle and subtotal entries, and a button 16 which causes the business machine 14 to cycle and total entries. Since the button 16 which causes a business machine 14 to cycle and accept an entry as a price entry is customarily large and frequently used it has been found desirable to use two simultaneously energized button depressors 15a and 15b to depress this button 16.

A switch plate 74 is attached to a flange 71 and extends downward along one side of the business machine 14. Two microswitches SS and SC are mounted on the switch plate 74 between the switch plate 74 and the side of the business machine 14. These microswitches SS and SC have actuator arms 76 and 77 pivotally attached and extending beneath the lower edge of the switch plate 74. The actuator arm 76 operates the microswitch SS and extends to the left side and the actuator arm 77 operates the microswitch SC and extends to the right side of an opening in the side of the business machine 14.

The opening 78 exposes the end of the crank frequently found in business machines 14. The crank usually has a hub 79 at its end adjacent to the opening 78. A lever 80 is attached to the hub 79 perpendicular to the center-line of the crank and the hub 79 and an actuator pin 81 is fixedly inserted through one end of the lever 80. The crank of a business machine 14 rotates approximately ninety degrees in a counter clockwise direction as viewed through an opening 78 in the right side of a business machine each time the business machine 14 cycles in response to the pressing of a button 16 which causes the business machine 14 to accept an entry represented by depressed buttons 16 having dollar and cent indicia as a price entry, the pressing of a button 16 which causes the business machine 14 to accept a similar entry as a tax entry, the pressing of a button 16 which causes the business machine 14 to subtotal a plurality of entries, or the pressing of a button 16 which causes the business machine 14 to total a plurality of entries and completely clear itself for another series of entries. After the business machine 14 cycles, the crank rotates in a clockwise direction and returns to its original or at rest position.

The lever 80 and pin 81 move with crank as it rotates with each cycle of the business machine 14 and the lever 80 is positioned on the crank and the actuator arms 76 and 77 are positioned relative to the path of the pin 81 as the business machine 14 cycles so that the pin 81 engages the actuator arm 76 only when the crank is in or near normal position and engages the actuator arm 77 only when the crank is rotating with cycling of the business machine 14.

When the actuator 76 is engaged by the pin 81, the actuator arm 76 closes the microswitch SS and when the actuator arm 77 is engaged by the pin 81, the actuator arm 77 closes the microswitch SC. This arrangement of actuator arms 76 and 77 and of the pin 81 moved by rotation of the crank of the business machine 14 permits the closing of the microswitch SS to indicate that the business machine 14 is in ready condition and the closing of the microswitch SC to indicate that the business machine has cycled. A cover 90 is provided for the transducer unit 55 to protect the components described and to give the transducer 55 a pleasing appearance.

For those types of business machines 14 not having cranks which rotate each time the business machine 14 cycles, other means for indicating that the business machine 14 is in ready condition and has cycled will be necessary. Some business machines 14 have internal parts which change positions as the business machine 14 cycles and this change in position can be used to close properly placed microswitches SS and SC. Other business machines 14 have electrical circuits which are energized when the business machine 14 is in ready condition and when it is cycling and the flow of current in these circuits can be used in known manner to close microswitches SS and SC. Regardless of the manner in which the microswitches SS and SC are closed, the closing of the microswitch SS will indicate that the business machine 14 is in ready condition and the closing of the microswitch SC will indicate that the business machine 14 has cycled.

The specific electrical circuit arrangement of the apparatus will also vary in accordance with the particular business machine 14 with which the apparatus is used and with the entries which it is desired to make in the business machine 14 each time a key 11 is depressed. The circuit schematically shown in FIGURE 13 has been found useful where the apparatus is used to record each sale of various items in the recording unit 12 and to operate a business machine 14 so that the correct price of each item is automatically entered, the tax on a sale is entered, a subtotal for a sale is easily obtained, or a total for a sale is easily obtained.

Figure 13:
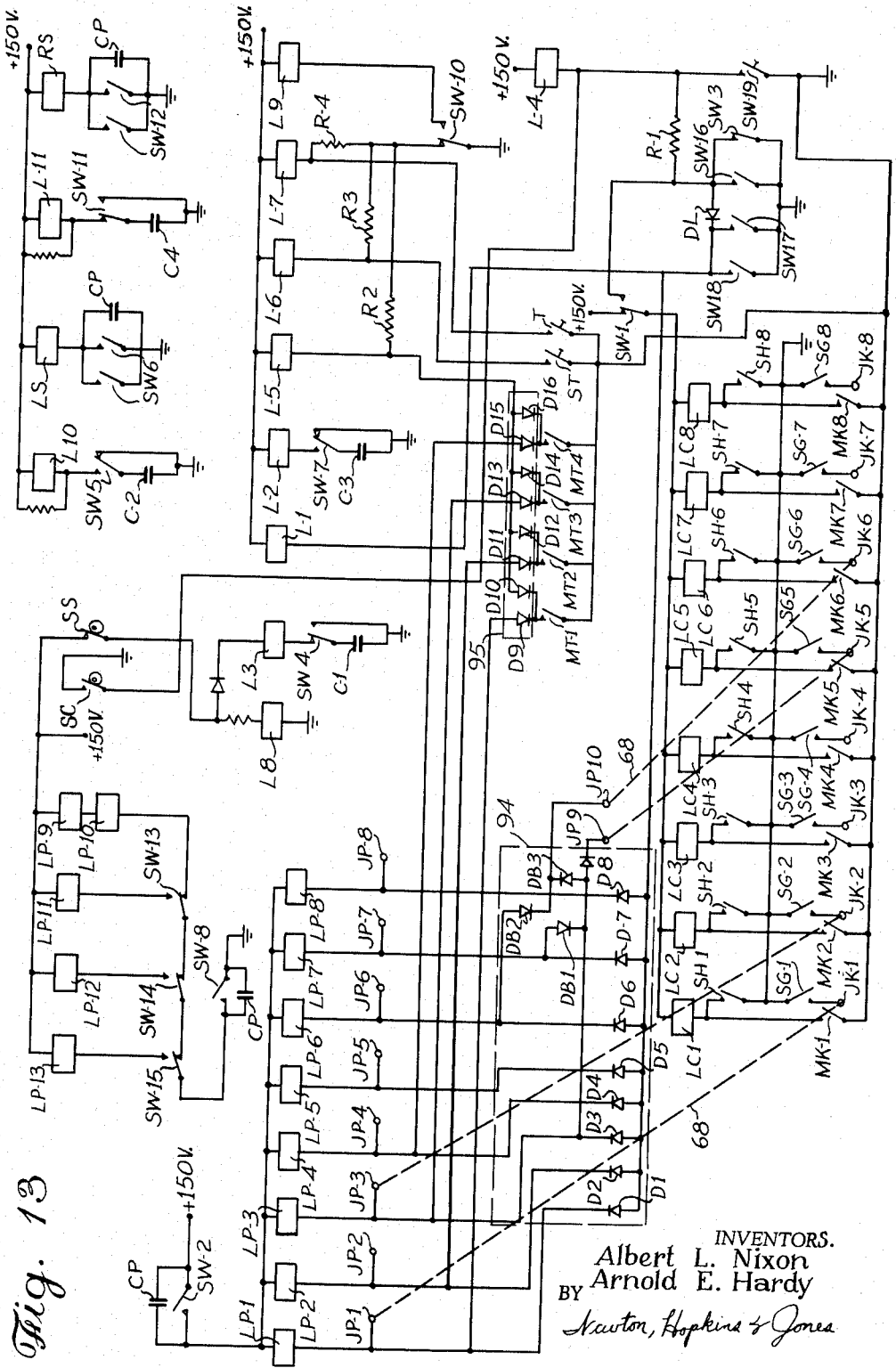
FIG. 13 is a schematic presentation of a preferred circuit for the business control apparatus.

Portions of the circuit schematically shown in FIGURE 13 have already been referred to in describing the apparatus. The relationship of these portions to the circuit as a whole and the circuit as a whole will be understood from the following description of the operation of the apparatus in terms of the circuit schematically shown in FIGURE 13.

In FIGURE 13 the jack JK–1 is patched with a patch cord 68 to the jack JP–1. The microswitch MK–1 is closed when a key 11 is depressed to indicate the sale of a particular item. A 150 volt D.C. voltage source of any known type is used throughout the circuit and is brought to the points indicated in FIGURE 13 in known manner. When this voltage source is initially applied to the circuit and when the business machine 14 is in ready condition, the switch SS places an electromagnet L–8 between ground and the voltage source. The flow of current through the electromagnet L–8 opens the normally closed switch SW–3 which will remain open as long as switch SS is closed. There may also be some initial flow of current through the switch SS, the electromagnet L–3, the switch SW–4, and the capacitor C–1 until the charge of the capacitor C–1 equals the voltage source. This has a clearing effect which will become apparent when the operation of the apparatus is better understood.

The closing of the microswitch MK–1 places the electromagnet LC–1 in series with the microswitch MK–1 and switch SW–1 between ground and a voltage source. This energizes the electromagnet LC–1 and causes it to advance the indicia of the counter 13 of which it is a part one unit so as to register a sale of the item. The energizing of electromagnet LC–1 also closes the switches SH–1 and SG–1. The closing of SH–1 establishes an electrical path to ground which parallels the path through MK–1 and permits MK–1 to open when the key 11 is released without breaking the circuit through LC–1. The closing of switch SG–1 places ground on the jack JK–1 and through the patch cord 68 to the jack JP–1.

The jack JP–1 is wired to a voltage source through the diode D–1 and the electromagnet L–1. Thus, with the closing of switch SG–1, current flows through the electromagnet L–1 and will continue to flow as long as the electromagnet LC–1 is energized. The flow of current through electromagnet LC–1 changes a switch SW–5 from its first and normal position connecting the two plates of a capacitor C–2 to its second position placing an electromagnet L–10 in series with the capacitor C–2 between ground and the voltage source. The resulting pulse of current through electromagnet L–10 until the charge on capacitor C–2 equals the voltage source causes switch SW–6 to close and place the locking solenoid LS briefly between ground and the voltage source. The resulting pulse of current through the locking solenoid LS moves the interlock plate 21 into locking position to prevent additional plungers 27 from being depressed. The interlock plate 21 remains in this position after switch SW–5 opens because the hook 48 is engaging the locking surface 49.

The flow of current through L–1 also changes a switch SW–7 from its first and normal position connecting the two plates of a capacitor C–3 to its second position placing an electromagnet L–2 in series with the capacitor C–3 between ground and the voltage source. Current will flow through the electromagnet L–2 until the charge on the capacitor C–3 equals the voltage source. This pulse of current through the electromagnet L-2 momentarily causes the switch SW-2 to close and the switch SW-4 to move to its second position connecting the two plates of the capacitor C-1.

The brief closing of switch SW-2 momentarily places the solenoid LP-1, the patch cord 68, the jack JK-1 and the switch SG-1 in series between ground and the voltage source. The resulting pulse of current through solenoid LP-1 causes the button depressor 15 to depress the button 16 of the business machine 14 beneath the button depressor 15. The button 16 depressed will be the button 16 having the price of the item shown on the key 11 initially depressed. If the price of the item changes, it is simply necessary to patch the jack JK-1 to a different jack JP such as jack J-2. If entry of the price of the item requires the depressing of a plurality of buttons 16, it is simply necessary to patch the jack JK-1 to a plurality of jacks JP using the patching panel 64.

The brief changing of the switch SW-4 to its second position permits the condenser C-1 to discharge. When the switch SW-4 returns to its first and normal position, current flows through the switch SS, the electromagnet L-3, and the switch SW-4 until the charge on C-1 again equals the voltage source. The resulting pulse of current through the electromagnet L-3 closes the normally open switch SW-8 momentarily.

The closing of switch SW-8 places the solenoids LP-9 and LP-10 in series between ground and the voltage source through a switch SW-13 in its normal first position, a switch SW-14 in its normal first position and a switch SW-15 in its normal first position. These solenoids LP-9 and LP-10 are in the button depressors 15a and 15b which simultaneously depress the button 16 of the business machine 14 which causes the machine to cycle and accept as a price entry the entry previously made when solenoid LP-1 was energized.

The cycling of the business machine 14 resulting from the depressing of the button 16 by the solenoids LP-9 and LP-10 causes the crank of the business machine 14 to rotate. As the crank rotates, the switch SS opens and the switch SC closes. The opening of the switch SS breaks the circuit through electromagnet L-8 and causes the switch SW-3 to close.

The closing of switch SC places the electromagnet L-4 and the switch SC in series between the voltage source and ground.

The flow of current through the electromagnet L-4 moves the switch SW-1 from its initial position placing the electromagnet LC-1 in series between the voltage source and ground through the switch SW-1 and the switch SH-1 to a second position placing the electromagnet LC-1 in series between the voltage source and ground through the electromagnet L-4, a resistor R-1, the switch SW-1 and the switch SH-1. The electromagnet L-4 is also in series between the voltage source and ground through the resistor R-1 and the switch SW-3 which is closed as long as switch SS is open.

The resistor R-1 limits the flow of current through L-4 and either switch SW-1 or SW-3. The current through SW-1 or SW-3 is sufficient only to hold the switches operated by the electromagnet L-4. Only the flow of current through the electromagnet L-4 and the switch SC will operate the switch SW-1. Thus, the previous closing of switch SW-3 when switch SS opened did not operate the switch SW-1. However, when switch SC subsequently opens as the crank returns to normal position, the closed switches SW-3 and SW-1 permit the electromagnet to continue to hold switch SW-1 in its second position.

The flow of current through the electromagnet L-4, the resistor R-1, the switch SW-1, the electromagnet LC-1 and the switch SH-1 is not sufficient for the electromagnet LC-1 to hold the switches SH-1 and SG-1 closed. Thus, these switches SH-1 and SG-1 open as the result of the moving of the switch SW-1 to its second position and current ceases to flow through switch SW-1. The switch SW-1 remains in its second position because of the flow of current through the electromagnet L-4 and the switch SW-3. Thus, until switch SW-3 opens and current ceases to flow through electromagnet L-4, none of the electromagnet LC can be energized with a large enough current to operate any switch SH or SG even if a key 11 is manually depressed and a microswitch MK is again closed. This and the locked position of the interlock plate 21 insures that a new entry cannot be made into the apparatus until the business machine 14 has finished cycling.

The initial flow of current through electromagnet L-4 and the switch SC also moves a switch SW-10 into a position which places an electromagnet L-9 between the voltage source and ground. The flow of current through the electromagnet L-9 changes a switch SW-11 from its normal position to that position in which it connects the two plates of a capacitor C-4. This discharges the capacitor C-4 and the switch SW-11 remains in this position after the initial flow of current through the electromagnet L-4 because of the continued flow of current through L-4 and the switch SW-3.

When the crank returns to its normal position at the end of a cycle, the switch SS is closed. The closing of switch SS causes current to flow through the electromagnet L-8. There will be no flow of current through the electromagnet L-3 because of the charge on the condenser C-1. The flow of current through electromagnet L-8 opens the switch SW-3 and opens the only remaining circuit through the electromagnet L-4. When current ceases to flow through the electromagnet L-4, the switch SW-1 returns to its normal position connecting the electromagnets LC directly to the voltage source. Thus, the closing of a microswitch MK will once again result in an electromagnet LC closing its switches SH and SG.

The plungers 27 may be again depressed to close a microswitch MK because when current ceases to pass through the electromagnet L-4, the switch SW-10 returns to its normal position stopping the flow of current through the electromagnet L-9. The interruption of current through the electromagnet L-9 causes the switch SW-11 to return to its normal position placing an electromagnet L-11 and the capacitor C-11 in series between the voltage source and ground. The capacitor C-11 has discharged while the switch SW-11 was in its second position and current now flows through the electromagnet L-11 until the charge on the condenser C-4 equals the voltage source.

The resulting pulse of current through the electromagnet L-11 momentarily closes a switch SW-12. The closing of the switch SW-12 places the releasing solenoid RS between the voltage source and ground and causes the interlock plate 21 to move to plunger 27 releasing position where the hook 44 engages the locking surface 45. The apparatus is now ready for a new entry and each time an item is sold, the depressing of a key will result in the sale being tabulated in a counter 13 and the correct sales price being entered in the business machine 14.

When it is desired to enter a tax on the sale of an item or a plurality of items, a tax button 50 showing the particular amount of tax is depressed. This closes a microswitch MT-1. The closing of microswitch MT-1 places an electromagnet L-5 between ground and the source of voltage through a diode D-10. The resulting flow of current through the electromagnet L-5 closes the normally open switch SW-16 and the closing of switch SW-16 places the electromagnet L-4 in series between the voltage source and ground through the resistor R-1. The resistor R-1 limits current flow through the electromagnet L-4 and the electromagnet L-4 does not operate the switches SW-1 and SW-10.

The electromagnet L-5 also changes the switch SW-13 from its normal first position to a second position connecting a solenoid LP-11 to the switch SW-8 through the switches SW-14 and SW-15. The solenoid LP-11 is in the button depressor 15 which depresses the button 16 of the business machine 14 which causes an entry to be accepted as a tax entry. However, no current flows through the solenoid LP-11 when the switch SW-13 operates because the switch SW-8 is open.

The electromagnet L-5 is also in series between the source of voltage and ground through a resistor R-2 and the switch SW-10 in its normal first position. The resistor R-2 limits the current through the electromagnet to such an extent that the electromagnet L-5 will not operate the switches SW-13 and SW-16. However, once the switches SW-13 and SW-16 have been operated by the flow of current through the electromagnet L-5 and the microswitch MT-1, current through the resistor R-2 will hold the switches SW-13 and SW-16 until the switch SW-10 moves to its second position and the circuit through resistor R-2 is broken. Thus, even if the tax button 50 is released and the microswitch MT-1 opens, the switches SW-13 and SW-16 remain operated until the electromagnet L-4 is energized to operate switch SW-10.

The closing of the microswitch MT-1 also places the electromagnet L-1 is series between ground and the source of voltage through the diodes D-1 and D-9. The flow of current through the electromagnet L-1 operates the switch SW-5 to move the interlock plate 21 to plunger 27 locking position in the manner already described and operates the switch SW-7 so as ultimately to close the switches SW-2 and SW-8 in the manner already described. The closing of switch SW-2 places the solenoid LP-1 in series between the voltage source and ground through the microswitch MT-1. This causes the button depressor 15 having the solenoid LP-1 to depress that button 16 of the business machine 14 which enters the amount of tax.

The closing of switch SW-8 places the solenoid LP-11 in series between the voltage source and ground through the switches SW-13, SW-14 and SW-15. The position of the switch SW-13 resulting from the energizing of electromagnet L-5 causes this flow of current through the solenoid LP-11 rather than through the solenoids LP-9 and LP-10 when the switch SW-8 closes. The resulting current through the solenoid LP-11 causes the button depressor 15 of which the solenoid LP-11 is a part to depress the button 16 of the business machine 14 which will accept the entry made by the previous closing of switch SW-2 as a tax entry and to cycle. As the business machine 14 cycles the switch SS opens and the switches SC and SW-3 close as previously described. The closing of switch SC causes sufficient current to flow through the electro-magnet L-4 to operate the switches SW-1 and SW-10.

The operation of switch SW-1 prevents sufficient current from passing through any electromagnet LC to operate any switch SH or SG as described above. The operation of switch SW-10 causes current to pass through the electromagnet L-9 and the ultimate return of the interlock plate 21 to plunger 27 releasing position as described above. The operation of switch SW-10 also breaks the circuit through electromagnet L-5 and resistor R-2. This causes the switches SW-13 and SW-16 to return to their normal first positions.

The switches SW-1 and SW-10 will remain operated after switch SC opens as the crank returns to normal position because the current through the electromagnet L-4, the resistor R-1, and switch SW-3 is sufficient to cause the electromagnet L-4 to hold switches SW-1 and SW-10. When the switch SS again closes and switch SW-3 opens, the switches SW-1 and SW-10 return to normal position as described above and the apparatus is ready for another entry. However, if the microswitch MT-1 is still depressed because of operator error, current will continue to flow through the electromagnet L-5, holding switch SW-16. Thus, electromagnet L-4 continues to hold the switches SW-1 and SW-10 even after switch SW-3 opens. This prevents a new entry even after the business machine 14 has completed cycling if the microswitch M-1 is still closed. The tax entered by depressing a tax button 50 is dependent upon which solenoid LC is connected to the microswitch MT closed by the tax button 50 and can be readily varied. Tax entries requiring the depressing of several buttons 16 can also be accommodated by connecting two solenoids LP to a single microswitch MT.

When it is desired to have the business machine 14 subtotal previous price entries the subtotal bar 51 is depressed. This closes the microswitch ST and places an electromagnet L-6 between the voltage source and ground. The flow of current through the electromagnet L-6 closes a switch SW-17 and changes the switch SW-14 to its second position connecting a solenoid LP-12 to the switch SW-8 through switch SW-15. The switches SW-14 and SW-17 remain operated after the microswitch ST opens with removal of pressure from the subtotal bar 51 because the electromagnet L-6 is in series between ground and the voltage source through a resistor R-3 and the switch SW-10 in its normal first position.

The resistor R-3 limits the current through the electromagnet L-6 and only the current through the microswitch ST will operate the switches SW-14 and SW-17. However, once the switches SW-14 and SW-17 operate, the current through the resistor R-3 will hold the switches SW-14 and SW-17 in operated position until the switch SW-10 moves to its second position with the energizing of the electromagnet L-4. No current flows when switch SW-14 initially operates because switch SW-8 is open. The switch SW-3 is also open because the crank is in normal position and current is passing through the electromagnet L-8.

The closing of switch SW-17 by the electromagnet L-6 places the electromagnet L-1 between the voltage source and ground. The flow of current through the electromagnet L-1 causes the interlock plate 21 to move to plunger 27 locking position and the switches SW-2 and SW-8 to operate as already described. The diode DL prevents the closing of the switches SW-3 and SW-16 from causing the flow of current through the electromagnet L-1. The operation of switch SW-2 has no effect since it completes no circuit. The operation of switch SW-8 causes current to flow through the solenoid LP-12 because of the position of switch SW-14 resulting from the energizing of the electromagnet L-6.

The solenoid LP-12 is in the button depressor 15 over the button 16 of the business machine 14 which causes the business machine 14 to subtotal entries. Thus, the flow of current through the solenoid LP-12 causes this button 16 to be depressed and the business machine 14 to cycle. As the business machine 14 starts to cycle, the crank rotates, the switch SS opens, and the switch SW-3 closes as already described. The closing of switch SC as the business machine 14 continues to cycle results in the operation of switches SW-1 and SW-10 as already described. The operation of switch SW-1 prevents any electromagnet LC from operating any switch SH or SG.

The operation of switch SW-10 breaks the circuit through the electromagnet L-6 and the resistor R-3. This causes the switches SW-14 and SW-17 to return to their normal first positions. Current continues to flow through electromagnet L-4 even after switch SC opens because of the circuit through SW-3 to ground. The continued holding of the switch SW-10 in its second position not only cause the switches SW-14 and SW-17 to return to their normal positions, but it also causes current to continue to flow through the electromagnet L-9. The flow of current through the electromagnet L-9 causes the interlock plate 21 to return to plunger 17 releasing position as already described. When the crank returns to normal position and the switch SS is again closed, the switch SW-3 opens to discontinue the flow of current through the electromagnet L-4 and return the apparatus to ready condition as described above. However, if the subtotal bar 51 is still depressed through operator error, the continuing flow of current through electromagnet L–6 and the microswitch ST will cause switch SW–17 to be still closed. This will provide a circuit through electromagnet L–4 even after SW–3 opens and prevent additional entries until the subtotal bar 51 is released.

When it is desired to total price and tax entries previously made, the total bar 52 is depressed. This closes the microswitch T. The closing of the microswitch T causes the same response of the apparatus as the closing of the microswitch ST except that in the response, the electromagnet L–7 replaces the electromagnet L–6, the resistor R–4 replaces the resistor R–3, the switch SW–15 replaces the switch SW–14, the switch SW–18 replaces the switch SW–17, and the solenoid LP–13 replaces the solenoid LP–12. The solenoid LP–13 is in the button depressor 15 which depresses the button 16 of the business machine 14 which causes the business machine to total entries and the other circuit components serve the same purposes when the microswitch T is closed as when the microswitch ST is closed.

The circuit shown in FIGURE 13 has spark suppression capacitors CP of known type and used in the understood fashion. It also utilizes double contact type switches for switches SW–6 and SW–12 because the current through these switches is sufficiently large to warrant its division in order to prolong the life of the switches SW–6 and SW–12. The switch SW–19 is a reset switch operated by plunger 98. When it is momentarily closed, current flows through the electromagnet L–4 and the interlock plate 21 is returned to releasing position to release any depressed plungers 27 in the manner already described. The diodes DB join jacks JP–9 and JP–10 in the understood manner to the circuits associated with other jacks JP. These jacks JP–9 and JP–10 are used for entries requiring the action of two button depressors 15 and which are so frequently made as to warrant more or less permanent wiring.

However, the specific circuit arrangement used with the apparatus may not only be varied by using patch cords 68, but also by placing portions of the circuit on printed circuit boards 91 and 92 which are easily and conveniently plugged into or removed from a connector block 93 mounted in the recording unit 12. In the specific embodiment of the invention described, the portion of the circuit within the dashed line 94 is on the pricing network board 91 and that within the dashed line 95 is on the tax network board 92. The use of pricing network board 91 permits a variety of relationships between solenoids LP to be quickly established simply by changing the pricing network board 91.

The tax network board 92 provides the same advantages with respect to tax entries. Moreover, since the boards 91 and 92 contain substantially all diodes used in the circuit, their use permits the convenient maintenance of that portion of the circuit requiring the most maintenance and repair. Since maintenance can be accomplished simply by removing a board 91 or 92 and replacing it with another board 91 or 92, maintenance is convenient and the apparatus is always in operating condition. Thus, the boards 91 and 92 provide the apparatus with both versatility and ease of maintenance.

It will be obvious to those skilled in the art that many variations may be made in the embodiments chosen for the purpose of illustrating the present invention without departing from the scope thereof as defined by the appended claims.

What is claimed as invention is:

1. Business control apparatus for recording each sale of each of a plurality of items as the sale of the particular item and for entering each sale in a business machine, said business machine having a plurality of buttons, some of said buttons being quantity buttons with quantitative indicia thereon and each of which enters an amount corresponding to the indicium on it into the business machine, one of said buttons being an add button which cycles the machine and causes it to accept the amount entered by depressing a quantity button as the price of an item, one of said buttons being a tax button which cycles the machine and causes it to accept the amount entered by depressing a quantity button as a tax, one of said buttons being a subtotal button which cycles the machine and causes it to subtotal entries previously accepted by the machine, and one of said buttons being a total button which cycles the machine and causes it to total entries previously accepted by the machine, said business machine having a crank which has a normal position and which rotates when the business machine cycles and said apparatus comprising, in combination, a first support plate having a plurality of slots; a second support plate having a plurality of slots and fixedly positioned parallel to the first support plate; an interlock plate positioned and slidably movable between the first support plate and the second support plate and having a plurality of slots; a plurality of plungers, one of said plungers being a subtotal plunger, one of said plungers being a total plunger, some of said plungers being item plungers, some of said plungers being tax plungers, each of said plungers extending perpendicular to the interlock plate and being in and slidably movable through one of the plurality of slots in the first support plate, one of the plurality of slots in the interlock plate, and one of the plurality of slots in the second support plate, and each of said plungers having its upper end above the first support plate, and its lower end below the lower support plate, a lower notch in its length between the upper support plate and the lower support plate, and an upper notch in its length between the lower notch and the upper support plate; a plurality of transparent keys, each key being fixedly attached to the upper end of one of the said item plungers and each key having a slit in its side extending into the key perpendicular to the said item plunger; a plurality of indicia means, each indicia means being inserted into a slit in one of the plurality of keys and each indicia means carrying the name of a particular item; a plurality of tax buttons, each tax button being fixedly positioned on the upper end of one of the said tax plungers and each tax button having an indicium indicating a particular amount of tax; a subtotal bar fixedly positioned on the upper end of the said subtotal plunger; a total bar fixedly positioned on the upper end of the said total plunger; a plurality of rings, each ring being fixedly positioned on the lower end of one of the plurality of plungers; a plurality of springs, each spring being fixedly positioned around one of the plurality of plungers and urging the plunger upward into a raised position in which the ring at the lower end of said plunger engages the lower support plate and the lower notch in the said plunger is in the plane of motion of the interlock plate; a plurality of normally open item microswitches, each item microswitch having an actuator which closes the item microswitch when the actuator is engaged and each item microswitch being positioned beneath one of the said item plungers in a location which causes the ring on the lower end of the item plunger to engage the actuator of the microswitch when the plunger is depressed to the degree necessary to place its upper notch in the plane of motion of the interlock plate; a plurality of tax microswitches, each tax microswitch having an actuator which closes the tax microswitch when the actuator is engaged and each tax microswitch being positioned beneath one of said tax plungers in a location which causes the ring on the lower end of the tax plunger to engage the actuator of the microswitch when the plunger is depressed to the degree necessary to place its upper notch in the plane of motion of the interlock plate; a subtotal microswitch having an actuator which closes the subtotal microswitch when the actuator is engaged and being positioned beneath the subtotal plunger in a location which causes the ring on the lower end of the subtotal plunger to engage the actuator of the microswitch when the plunger is depressed to the degree necessary to place its upper notch in the plane of motion of the interlock plate; a total microswitch having an actuator which closes the total microswitch when the actuator is engaged and being positioned beneath the total plunger in a location which causes the ring on the lower end of the total plunger to engage the actuator of the microswitch when the plunger is depressed to the degree necessary to place its upper notch in the plane of motion of the interlock plate; locking means responsive to the flow of current for slidably moving the interlock plate into those upper notches and lower notches of the plurality of plungers in its plane of motion; releasing means responsive to the flow of current for slidably moving the interlock plate out of those upper notches and lower notches of the plurality of plungers in its plane of motion; a plurality of counters; each counter having an electromagnet, indicia which advance one unit when the electromagnet is energized, and a first switch and a second switch which close when the electromagnet is energized; a plurality of button depressors, one of said button depressors being a price depressor and being positioned over the add button of the business machine, one of said button depressors being a tax depressor and being positioned over the tax button of the business machine, one of said button depressors being a subtotal depressor and being positioned over the subtotal button of the business machine, one of said button depressors being a total depressor and being positioned over the total button of the business machine, some of said button depressors being quantity depressors and being positioned over the quantity buttons of the business machine, and each of said button depressors having means for depressing the button of the business machine beneath it when current flows through the said means; a crank adaptor fixedly attached to the crank of the business machine; a pin extending from the crank adaptor and which moves with the crank as the crank rotates when the business machine cycles; a normally open start switch positioned adjacent to the crank and closed by the pin when the crank is in and near normal position; a normally open cycling switch positioned adjacent to the crank and closed by the pin when the crank rotates as the business machine cycles; a first circuit means responsive to the closing of an item microswitch and for energizing the electromagnet of one of the plurality of counters; a second circuit means responsive to the closing of the first switch of the said counter and for continuing the energizing of the said electromagnet if the first circuit means opens; a third circuit means responsive to the closing of the second switch of the counter and for passing current through one of the plurality of quantity depressors, through the price depressor, and through the locking means; a fourth circuit means responsive to the closing of a tax microswitch and the start switch and for passing current through one of the plurality of quantity depressors, through the tax depressor, and through the locking means; a fifth circuit means responsive to the closing of the subtotal microswitch and the start switch and for passing current through the subtotal depressor and the locking means; a sixth circuit means responsive to the closing of the total microswitch and for passing current through the total depressor and the locking means; and a seventh circuit means responsive to the closing of the cycling switch and for passing current through the release means and returning the apparatus to ready position.

2. Business control apparatus for recording each sale of each of a plurality of items as the sale of a particular item and for entering each sale in a business machine, said business machine having a plurality of buttons, start means for indicating that it is ready for an entry, and cycle means for indicating that it has completed a cycle and said apparatus comprising, in combination, a first support plate having a slot; a second support plate having a slot and fixedly positioned parallel to the first support plate; an interlock plate positioned and slidably movable between the first support plate and the second support plate and having a slot; a plunger extending perpendicularly to the interlock plate and being in and slidably movable through the slot in the first support plate, the slot in the interlock plate, and slot in the second support plate, said plunger having its upper end above the first support plate, its lower end below the lower support plate, a lower notch in its length between the upper support plate and the lower support plate, and an upper notch in its length between the lower notch and the upper support plate; a key fixedly attached to the upper end of the plunger, a ring fixedly positioned on the lower end of the plunger; a spring fixedly positioned around the plunger and urging the plunger upward into a raised position in which the ring at its lower end engages the lower support plate and the lower notch in the said plunger is in the plane of motion of the interlock plate; a microswitch having an actuator which closes when the actuator is engaged and being positioned beneath the plunger in a location which causes the ring on the lower end of the plunger to engage the actuator of the microswitch when the plunger is depressed to a degree necessary to place its upper notch in the plane of motion of the interlock plate; locking means responsive to the flow of current through it for slidably moving the interlock plate into the notch of the plunger in its plane of motion; releasing means responsive to the flow of current through it for slidably moving the interlock plate out of the notch of the plunger in its plane of motion; a counter having an electromagnet, indicia which advance one unit when the electromagnet is energized, a normally open switch which closes when the electromagnet is energized; a button depressor positioned over one of the plurality of buttons of the business machine and having depressing means for depressing said button when current flows through said means; a normally open start switch which closes in response to the start means of the business machine; a normally open cycling switch which closes in response to the cycle means of the business machine; circuit means for passing current through the locking means and the depressing means of the button depressor when the microswitch closes and when the start switch is closed; circuit means for discontinuing the flow of current through the depressing means of the button depressor; and circuit means for passing current through the releasing means when the cycling switch closes.

3. Apparatus for indicating by depressing a plunger each sale of an item and entering the sale into a business machine into which quantities are entered and which cycles with each entry, said apparatus, comprising, in combination, a first switch positioned beneath the plunger and closed by the depressing of the plunger; a button solenoid for causing a quantity entry to be made in the business machine; a cycling solenoid for causing the business machine to cycle; a first condenser; a second condenser; a third condenser; a fourth condenser; a second switch; a third switch with a first and second position; a fourth switch with a second position and a first position connecting the plates of the first condenser; a fifth switch with a first position connecting the plates of the second condenser and a second position; a sixth switch with a first position connecting the plates of the third condenser and a second position; a seventh switch with an open position and a closed position; an eighth switch; a ninth switch; a tenth switch with a first position and a second position; an eleventh switch with a first position and a second position; a twelfth switch with a first position connecting the plates of the fourth condenser and a second position; a counter having indicia and a first electromagnet which when energized closes the second switch and advances the indicia one unit; a second electromagnet which when energized moves the fourth switch to its second position; a third electromagnet which when energized moves the sixth switch to its second position and closes the seventh switch; a fourth electromagnet which when energized closes the ninth switch; a fifth electromagnet which when energized closes the eighth switch; a sixth electomagnet which when energized moves the third switch to its second position and the thirteenth switch to its second position; a seventh electromagnet which when energized moves the eleventh switch to its second position; an eighth electromagnet moves the tenth switch to its second position; a ninth electromagnet which when energized moves the twelfth switch to its second position; first circuit means for connecting the eighth electromagnet between the voltage and ground through the closed position of the start switch; and second circuit means for connecting the first electromagnet between the voltage and ground through the closed position of the first switch and the first position of the third switch; third circuit means for connecting the second electromagnet between voltage and ground through the closed position of second switch; fourth circuit means for connecting the third electromagnet between the voltage and ground through the second position of the fourth switch and the first capacitor; fifth circuit means for connecting the fourth electromagnet between the voltage and ground through the second position of the fifth switch and the second capacitor; sixth circuit means for connecting the fifth electromagnet between the voltage and ground through the second position of the sixth switch, the closed position of the start switch, and the third capacitor; seventh circuit means for connecting the button solenoid between the voltage and ground through the closed position of the seventh switch; eighth circuit means for connecting the cycling solenoid between the voltage and ground through the closed position of the eighth switch; ninth circuit means connecting the locking solenoid between the voltage and ground through the closed position of the ninth switch; tenth circuit means connecting the sixth electromagnet between the voltage and ground through the closed position of the cycling switch; eleventh circuit means connecting the first electromagnet between the voltage and ground through the second position of the third switch and the first resistor; twelfth circuit means connecting the seventh electromagnet between the voltage and ground through the second position of the twelfth switch; thirteenth circuit means connecting the sixth electromagnet between the voltage and ground through the first position of the tenth switch; fourteenth circuit means for connecting the ninth electromagnet between the voltage and ground through the second position of the eleventh switch and the fourth capacitor; and a fifteenth circuit means for connecting the releasing solenoid between the voltage and ground through the second position of the twelfth switch.

4. Business control apparatus including: a keyboard unit having a plurality of keys, a plurality of microswitches, each of said microswitches being adjacent one of said keys to be operated thereby, and first circuit means associated with said plurality of microswitches; a business machine having a plurality of buttons for entering data into said business machine, means for cycling said business machine to record the data entered into said business machine by said buttons; a transducer unit disposed over said plurality of buttons of said business machine, said transducer having a plurality of button depressors, each of said button depressors being disposed over one of said buttons of said business machine to depress the button, each of said button depressors having a button solenoid, second circuit means associated with said button solenoids of said button depressors; a recording unit having a plurality of counters, a plurality of counter solenoids, each of said counter solenoids being arranged to index its associated counter by one unit each time said counter solenoid is energized, a plurality of first switches, a plurality of second switches, said first switches and said second switches being closed upon energization of said counter solenoids, a patch board in said recording unit and including a plurality of input jacks, a plurality of output jacks, each of said output jacks being electrically connected to one of said first switches, said input jacks being electrically connected into said second circuit means, a plurality of patch cords for selectively connecting certain of said output jacks to certain of said input jacks; said first circuit means being electrically connected to said counter solenoids so that, when one of said keys of said keyboard is depressed to close one of said microswitches, one of said counter solenoids will be energized.

5. Apparatus for operating a business machine including a keyboard having a plurality of keys, a plurality of microswitches, each of said plurality of microswitches being operable by one of said plurality of keys, a plurality of counters, each of said counters having a counter solenoid and a pair of switches associated with said counter solenoid and operable thereby, a first circuit means to connect said keys to said counter solenoids, second circuit means to connect one of said pair of switches with its associated counter solenoid so that said associated counter solenoid will remain energized through said one of said pair of said switches, a transducer to operate said business machine, said transducer including a plurality of plunger solenoids, third circuit means to connect said microswitches with said plunger solenoids, said third circuit means including a patch board having a plurality of input jacks, a plurality of output jacks, a plurality of patch cords, said output jacks receiving an electrical signal from said first circuit means, fourth circuit means connecting said plurality of plunger solenoids to said input jacks, said patch board allowing the other of said pair of switches of said counters to energize selected ones of said plunger solenoids.

References Cited by the Examiner

UNITED STATES PATENTS

| | | | |
|---|---|---|---|
| 2,014,432 | 9/35 | Gerhold | 235—146 |
| 2,293,127 | 8/42 | Fishack. | |
| 2,434,500 | 1/48 | Leathers | 235—204.6 |
| 2,469,754 | 5/49 | Tierney. | |
| 2,964,740 | 12/60 | Hense. | |
| 2,997,703 | 8/61 | Powell | 235—145 |
| 3,003,694 | 10/61 | Oxley | 235—146 |
| 3,085,746 | 4/63 | Pasinski et al. | 235—145 |
| 3,125,289 | 3/64 | Aronson | 235—54 |

LEO SMILOW, *Primary Examiner.*